United States Patent [19]

Nakagawa et al.

[11] 4,108,124

[45] Aug. 22, 1978

[54] MANIFOLD SYSTEM

[75] Inventors: Yasuhiko Nakagawa, Fujisawa; Kosabro Mukai, Tokyo, both of Japan

[73] Assignee: Nissan Motor Company, Ltd., Japan

[21] Appl. No.: 675,624

[22] Filed: Apr. 9, 1976

[30] Foreign Application Priority Data

Apr. 10, 1975 [JP] Japan .................. 50-43537

[51] Int. Cl.² ............................ F02M 31/00
[52] U.S. Cl. ................. 123/122 AC; 123/32 ST; 123/52 M; 261/144; 261/145
[58] Field of Search ............ 123/122 AB, 122 AC, 123/52 MV, 52 R, 52 M, 32 ST, 32 SP, 41.31, 41.22; 261/144, 145

[56] References Cited
U.S. PATENT DOCUMENTS

| 3,832,984 | 9/1974 | Taguchi | 123/122 AC |
| 3,850,153 | 11/1974 | Sigwald | 123/122 AB |
| 3,877,444 | 4/1975 | Senga | 123/122 AB |
| 3,973,543 | 8/1976 | Nakada | 123/122 AC |
| 3,994,270 | 11/1976 | Nakano | 123/122 AB |
| 3,994,271 | 11/1976 | Ishizuya | 123/122 AB |
| 4,009,701 | 1/1977 | Ruf | 123/122 AB |
| 4,016,846 | 4/1977 | Nakano | 123/122 AB |

Primary Examiner—Ronald H. Lazarus

[57] ABSTRACT

Herein disclosed is a manifold system for an internal combustion engine of the type having an auxiliary combustion chamber associated with each main combustion chamber and connected by a torch passage. The manifold system includes a main intake manifold for distributing a lean air-fuel mixture to all of main combustion chambers of the engine, an auxiliary intake manifold for distributing a rich air-fuel mixture to all of auxiliary combustion chambers of the engine; and a cooling liquid passage extending in contact with the main and auxiliary intake manifolds to heat the lean and rich air-fuel mixtures.

4 Claims, 6 Drawing Figures

MANIFOLD SYSTEM

BACKGROUND OF THE INVENTION

The present invention relates to an internal combustion engine of the type having an auxiliary combustion chamber associated with each main combustion chamber and connected by a torch passage. More particularly, this invention is directed to a manifold system for an internal combustion engine.

Internal combustion engines having an auxiliary combustion chamber associated with each main combustion chamber and connected thereto by a torch passage are well known in the art. A rich air-fuel mixture is supplied to each auxiliary combustion chamber through an auxiliary intake manifold and a lean air-fuel mixture is supplied to each main combustion chamber through a main intake manifold. The total air-fuel (A/F) ratio of the mixtures on which the engines of the above character can operate is great and thus the exhaust gas contain oxygen rich enough for self-oxidation within exhaust manifold of the engine only if it is maintained at elevated temperature.

To vaporize fuel to be supplied to each auxiliary and main combustion chambers of an engine, in a conventional manifold system, heat risers of auxiliary and main intake manifolds are heated with the exhaust gas flowing along an exhaust manifold. This conventional manifold system has a difficulty that when the engine is cold the temperature of the exhaust gas will become too low to facilitate oxidation of noxious components in the exhaust gas because there is a substantial heat transfer from the exhaust manifold to the heat risers.

SUMMARY OF THE INVENTION

A main object of the present invention is to provide a manifold system for an internal combustion engine of the type having an auxiliary combustion chamber associated with each combustion chamber and connected by a torch passage, the manifold system reducing the use of exhaust gas as the heat source for vaporization of fuel to be supplied to each auxiliary and each main combustion chamber of the engine.

Another object of the present invention is to provide a manifold system in which good vaporization of fuel to be supplied to each auxiliary and each main combustion chamber of the engine is effected, while drop in temperature of exhaust gas is minimized.

BRIEF DESCRIPTION OF THE DRAWINGS

The present invention becomes clear from the following description in connection with the accompanying drawings, in which.

DESCRIPTION OF THE PREFERRED EMBODIMENTS

Figure 1:
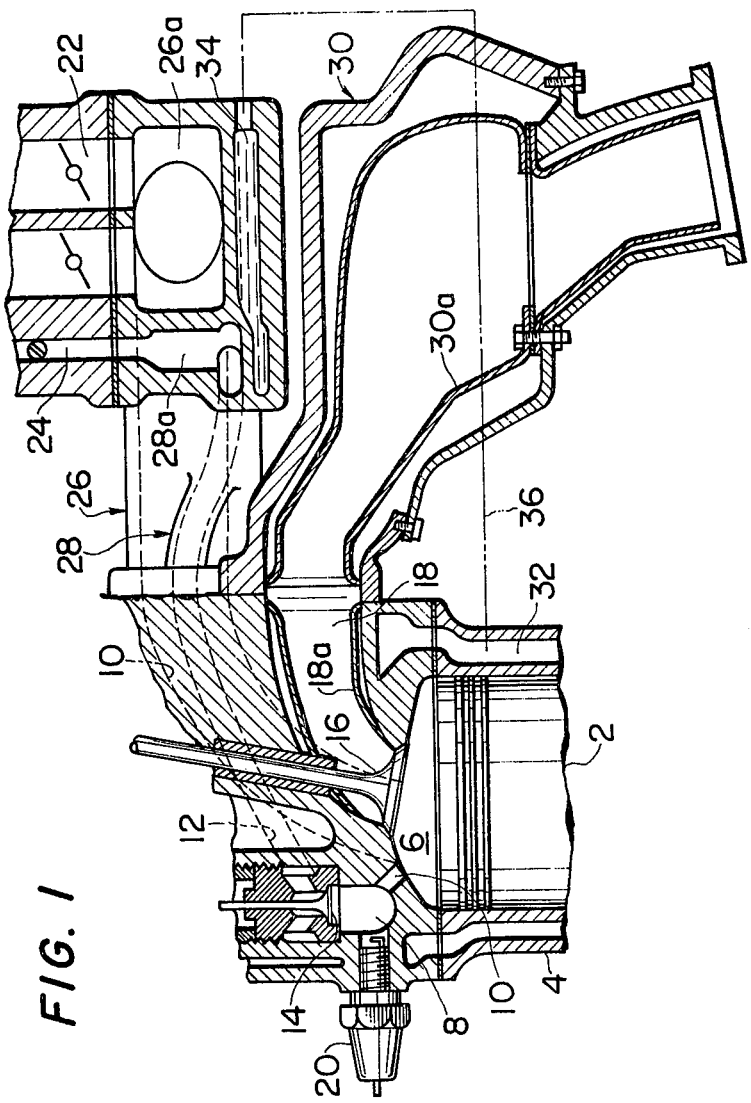
FIG. 1 is a sectional view an internal combustion engine embodying the present invention.

Referring to FIG. 1, a combustion chamber arrangement of the type having an auxiliary combustion chamber associated with a main combustion chamber is disclosed. It is to be understood that more than one such chamber arrangment may be employed with a manifold system. Each such arrangement includes a piston 2 conventionally positioned within a cylinder located in the engine block 4. A main combustion chamber 6 is provided above the piston 2 and an auxiliary combustion chamber 8 is provided which is displaced from the main combustion chamber 6. The auxiliary combustion chamber 8 is in communication with the main combustion chamber 6 through a torch passage 10.

A lean air-fuel mixture is intermittently supplied to the main combustion chamber 6 through a main intake passage 10. Communication between the main intake passage 10 and the main combustion chamber 6 is controlled by a main intake valve (not shown). A rich air-fuel mixture is supplied to the auxiliary combustion chamber 8 through an auxiliary intake passage 12. A relatively small auxiliary intake valve 14 controls the intake of the rich air-fuel mixture to the auxiliary combustion chamber 8. An exhaust valve 16 controls the discharging of the exhaust gases from the main combustion chamber 6 into an exhaust passage 18.

A spark plug 20 is positioned in the auxiliary combustion chamber 8 and is employed to initiate combustion. The rich air-fuel mixture in the auxiliary combustion chamber 8 is ignited by the spark plug 20. A flame is thereby generated which projects into the main combustion chamber 6 through the torch passage 10. The introduction of the flame through the torch passage 10 acts to bring about ignition and combustion of the lean air-fuel mixture within the main combustion chamber 6. This combustion sequence can be used to substantially improve the purity of the exhaust gases and effect a corresponding reduction in the creation of air pollution.

A main carburetor 22 is provided for creating a lean air-fuel mixture for each main combustion chamber 6. An auxiliary carburetor 24 provides a rich air-fuel mixture for each auxiliary combustion chamber 8. A main intake manifold 26 is associated with the main carburetor 22 for distributing the resulting lean air-fuel mixture from the carburetor 22 to the main intake passages 10. An auxiliary intake manifold 28 is provided for distributing the rich air-fuel mixture from the auxiliary carburetor 24 to the auxiliary intake passages 12. Combusted gases are exhausted through an exhaust manifold 30.

To heat risers 26a and 28a of the main and auxiliary intake manifolds 26 and 28 so that the fuel may be substantially vaporized before combustion, the cooling liquid associated with the engine is bypassed from a cooling liquid passageway 32 of the engine cooling system to a cooling liquid passage 34 through a conventional passageway schematically illustrated as 36. The passage 34 is formed below the bottom walls of the heat risers 26a and 28a to provide a heat transfer from the passage 34 to the risers 26a and 28a.

To prevent heat transfer from the exhaust manifold 30 to the main and auxiliary intake manifolds 26 and 28 which would otherwise cause reduction of the temperature of exhaust gases, the intake manifolds 26 and 28 are spaced from the exhaust manifold 30 for the purpose of insulation. Preferably a port liner 18a should be installed in the exhaust passage 18 and an inner liner or core 30a be installed in the exhaust manifold 30 to minimize heat loss.

It will be noted from the preceding description concerning FIG. 1 that fuel in the intake mixtures can be vaporized without lowering temperature of exhaust gases, with the result that the operation of the engine with less air pollution is made possible.

Although in the first embodiment illustrated in FIG. 1 heat transfer from the exhaust manifold 30 to the main and auxiliary intake manifolds 26 and 28 are prevented by arranging the main and auxiliary intake manifolds 26 and 28 in a spaced relationship with the exhaust manifold 30, the main and auxiliary intake manifolds 26 and 28 may contact with or may be mounted on the exhaust manifold 30 so far as heat transfer from the exhaust manifold to the main and auxiliary intake manifold through the contact areas is too little to affect reaction temperature in the exhaust manifold.

Figure 2:
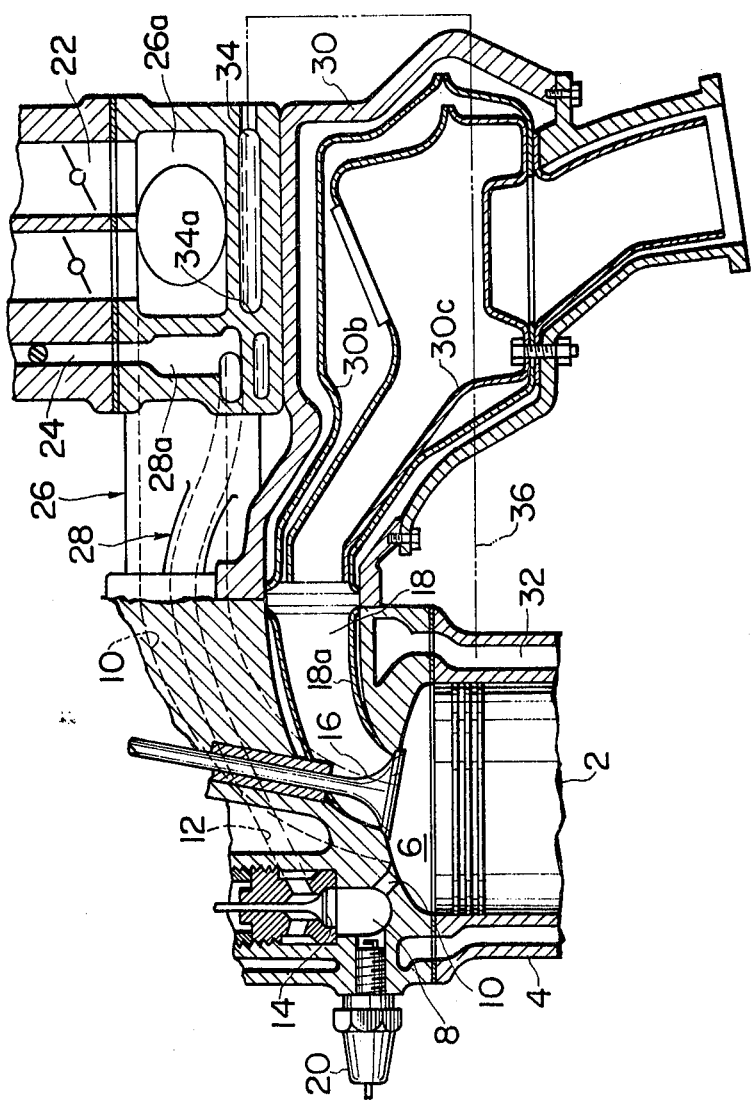
FIG. 2 is a similar view to FIG. 1 showing a second embodiment of the present invention.

The second embodiment shown in FIG. 2 is basically similar to the embodiment shown in FIG. 1 so that the same reference numerals are used to designate similar parts. However, this embodiment is different from the first embodiment in that a passage 34 is provided with a partition 34a to provide two separate flow paths for heating main and auxiliary heat risers 26a and 28a, respectively. Another difference resides in that with the bottom of the passage 34 contacting the top of a control portion of an exhaust manifold 30, main and auxiliary intake manifolds 26 and 28 are connected to the exhaust manifold 30 so as to employ heat transmitted from the exhaust manifold 30 and so as to minimize heat transfer from the exhaust manifold 30 to heat risers 26a and 28a. Still another difference is that to enhance heat insulating capacity of the exhaust manifold 30, a dual-walled liner construction including an outer core 30b and an inner core 30c is installed in the exhaust manifold 30.

Although only two examples of the liner constructions for the exhaust manifolds are illustrated in FIGS. 1 and 2, there is still another possibility that the liner structure may take the form of alternate layers of liner plates and thermal insulators.

It will readily be understood that if a catalytic converter is arranged downstream of the exhaust manifold, oxidation reaction under the catalyst will be promoted without additional heat source because the temperature of exhaust gases from the exhaust manifold 30 is maintained high enough for enabling the temperature within the catalytic converter well above the minimum reaction temperature.

Figure 3:
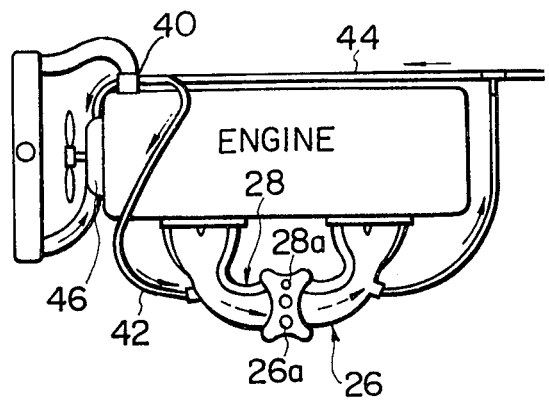
FIG. 3 is a plan view showing a third embodiment of an internal combustion engine according to the present invention.
Figure 5:
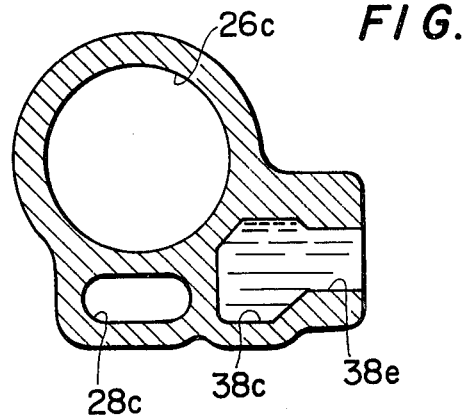
FIG. 5 is a section taken through line V—V of FIG. 4.
Figure 6:
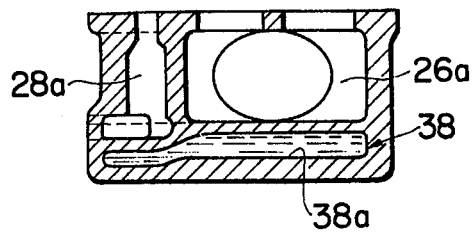
FIG. 6 is a section taken through line VI—VI of FIG. 4.
Figure 4:
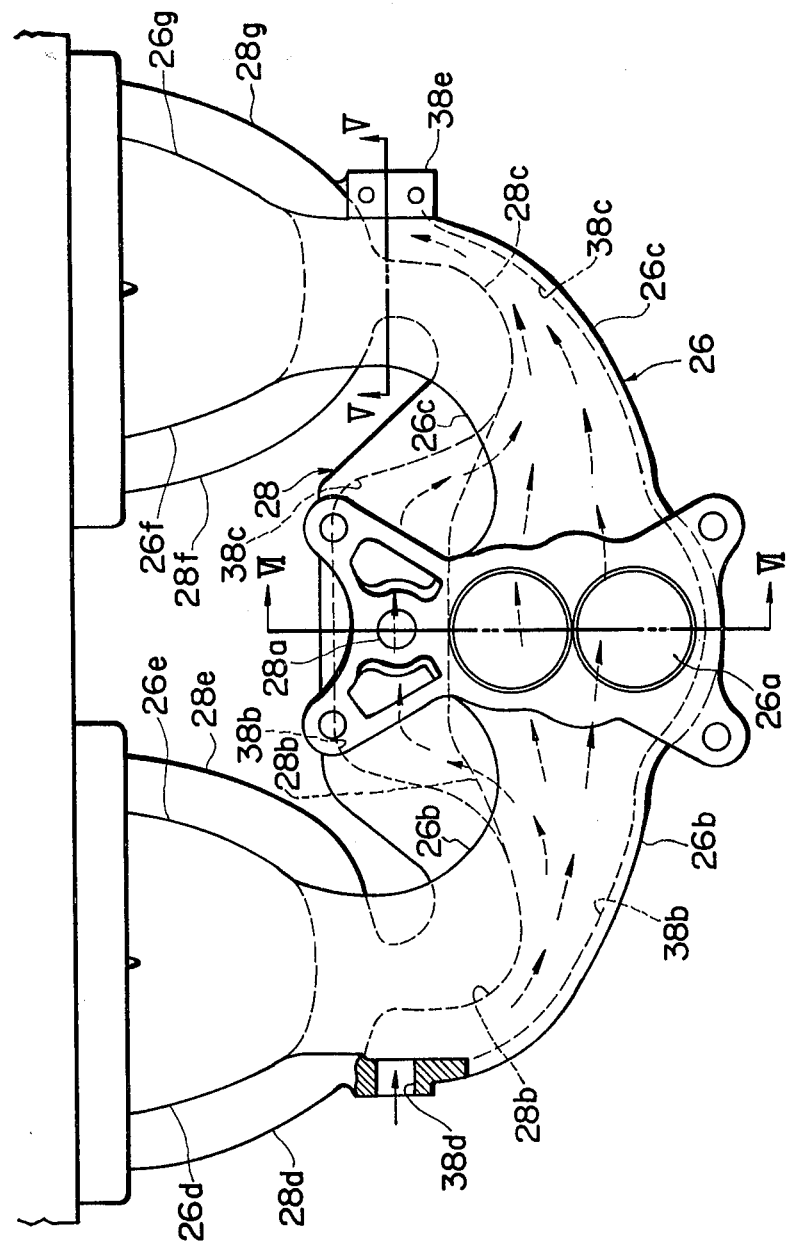
FIG. 4 is an enlarged fragmentary view of FIG. 3.

The third embodiment shown in FIGS. 3 through 6 is basically similar to the first or second embodiment except for a cooling liquid passage which is now indicated at 38. The passage 38 includes three portions, a main portion 38a extending below heat risers 26a and 28a of main and auxiliary intake manifolds 26 and 28 and two leg portions 38b and 38c on the opposite sides of the main portion 38a. The main intake manifold two passages 26b and 26c extending outwardly from the heat riser 26a, each splitting into two branch passages 26d and 26e or 26f and 26g to meet main intake passages formed in the engine block which direct the lean air-fuel mixture to two main combustion chambers such as 6 (see FIG. 1 or 2). The auxiliary intake manifold 28 includes two passages 28b and 28c extending outwardly from the heat riser 28, each splitting into two branch passages 28d and 28e or 28f and 28g to meet auxiliary intake passages, such as (see FIG. 1 or 2), formed in the engine head which direct the rich air-fuel mixture to two auxiliary combustion chambers, such as 8. Extending longitudinally along the passages 26b and 28b is the leg portion 38b of the jacket 38 to provide heat transfer to the passages 26b and 28b. Similarly the other leg portion 38c extends longitudinally along the passages 26c and 28c to provide heat transfer thereto. As seen in FIGS. 5 and 6 the main and auxiliary intake manifolds and the passage 38 are integral with each other. The passage 38 is connected by an inlet connector 38d and outlet connector 38e to the cooling system of the engine. Preferably the inlet connector 38d is connected to cooling liquid passageway of the engine cooling system adjacent to and upstream of a thermostat 40 to introduce hot engine cooling liquid having circulated through the engine block into the passage 38 by a hose 42 and the outlet connector 38e to a hose 44 for return flow of the coolant from a heater for passenger compartment (not shown) to get the engine coolant to flow from the passage 38 back to a pump 46, as schematically illustrated in FIG. 3. The leg portions 38b and 38c and main portion 38a are cooperating to form a passageway to provide the flow of the engine cooling liquid from the inlet connector 38d to the outlet connector 38e, as represented by dotted arrows shown in FIG. 4.

Alternatively, leg portions 38b and 38c may be lengthened to cover the branch passages 26d, 26e, 26f, 26g, 28d, 28e, 28f and 28g to provide heat transfer to them. In this case the leg portions can be directly connected to the cooling liquid passageway formed in the engine block to introduce the engine cooling liquid into the passage 38, although not shown.

It is to be noted that placing the jacket not only on the heat risers but also on at least a portion of passages connecting the risers with the engine block will improve vaporization of fuel significantly because the passages are kept warm.

It has been confirmed according to the experiments that amount of heat transfer from the cooling liquid passage to the auxiliary intake manifold should be from 20 per cent to 40 per cent of the total amount of heat transfer from the water cooling liquid passage to the main and auxiliary intake manifolds. The configuration of the jacket and the amount of flow of the engine coolant through the cooling liquid passage should be determined to meet the above mentioned requirement. Practically saying, area through which heat is transferred from the cooling liquid passage to the auxiliary intake manifold should be set from 20 per cent to 40 per cent of the total area through which heat is transferred from the cooling liquid passage to the main and auxiliary intake manifolds, if the amount of flow through the cooling liquid passage is limited. If the amount of area through which heat is transferred is limited, then amount of flow should be varied to meet the above mentioned requirement.

It will now be appreciated from the preceding that because the use of exhaust gases as the main heat source for heating the intake mixtures to promote fuel vaporization is eliminated and replaced by the use of bypass cooling liquid from the engine cooling system as the heat source, the fatal drop of the temperature of the exhaust gases is prevented, thus promoting the oxidation reaction within the exhaust manifold.

Usually the temperature of the engine coolant in the engine cooling system is approximately from 70° centigrade to 90° centigrade. If it is desired to increase the temperature of the engine coolant water that is usually used as the engine cooling liquid should be replaced with a liquid having a higher boiling point that of the water, such as an ethylene glycol or a water solution of an ethylene glycol.

What is claimed is:

1. In an engine system:

an internal combustion engine comprising a cooling system having a cooling liquid passageway with a thermostat and a pump for the cooling liquid, and an engine block having an auxiliary combustion chamber, a main combustion chamber and a passage interconnecting said auxiliary and said main combustion chambers;

a main intake manifold having a first riser and at least one first manifold passage extending from said first heat riser toward said main combustion chamber;

an auxiliary intake manifold having a second heat riser and at least one second manifold passage extending from said second heat riser toward said auxiliary combustion chamber;

means for supplying a lean air-fuel mixture to said first riser to supply the air-fuel mixture to said main combustion chamber through said main intake manifold;

means for supplying a rich air-fuel mixture to said second heat riser to supply the rich air-fuel mixture to said auxiliary combustion chamber through said auxiliary intake manifold;

a cooling liquid passage having an inlet thereof connected to that portion of said cooling liquid passageway of said cooling system which is adjacent and upstream of said thermostat to introduce hot cooling liquid having circulated through said engine block into said cooling liquid passage, said cooling liquid passage having an outlet thereof connected to that portion of said cooling liquid passageway of said cooling system which permits return flow of the cooling liquid back to said pump, said cooling liquid passage and said first heat riser having a first common wall through which heat is transferred from the cooling liquid within said cooling liquid passage to the lean air-fuel mixture within said first heat riser.

said cooling liquid passage and said second heat riser having a second common wall through which heat is transferred from the cooling liquid within said cooling liquid passage to the rich air-fuel mixture within said second heat riser;

said first common wall forming the bottom of said first heat riser, said second common wall forming the bottom of said second heat riser;

an exhaust manifold connected to said main combustion chamber to receive exhaust gases from combustion within said main combustion chamber, said exhaust manifold being out of heat conductive contact with said main intake manifold and said auxiliary intake manifold;

whereby the lean and rich air-fuel mixtures are heated with the cooling liquid passage without causing an appreciable drop of the temperature of the exhaust gases within said exhaust manifold.

2. The combination as claimed in claim 1, in which said cooling liquid passage and said first manifold passage have a third common wall through which heat is transferred from the cooling liquid within said cooling liquid passage to the lean air-fuel mixture within said first manifold passage, and in which said cooling liquid passage and said second manifold passage have a fourth common wall through which heat is transferred from the cooling liquid within said cooling liquid passage to the rich air-fuel mixture within said second manifold passage.

3. The combination as claimed in claim 1, in which said cooling liquid passage includes a partition therein to divide the cooling liquid flowing through said cooling liquid passage into a first flow in contact with the bottom of said first heat riser and into a second flow in contact with the bottom of said second heat riser.

4. The combination as claimed in claim 1, in which the amount of heat transfer from the cooling liquid flowing through said cooling liquid passage to the rich air-fuel mixture within said auxiliary intake manifold is from 20 percent to 40 percent of the total amount of heat transfer from the cooling liquid flowing through said cooling liquid passage to the lean air-fuel mixture within said main intake manifold and to the rich air-fuel mixture within said auxiliary intake manifold.

* * * * *